United States Patent Office 3,383,950
Patented May 21, 1968

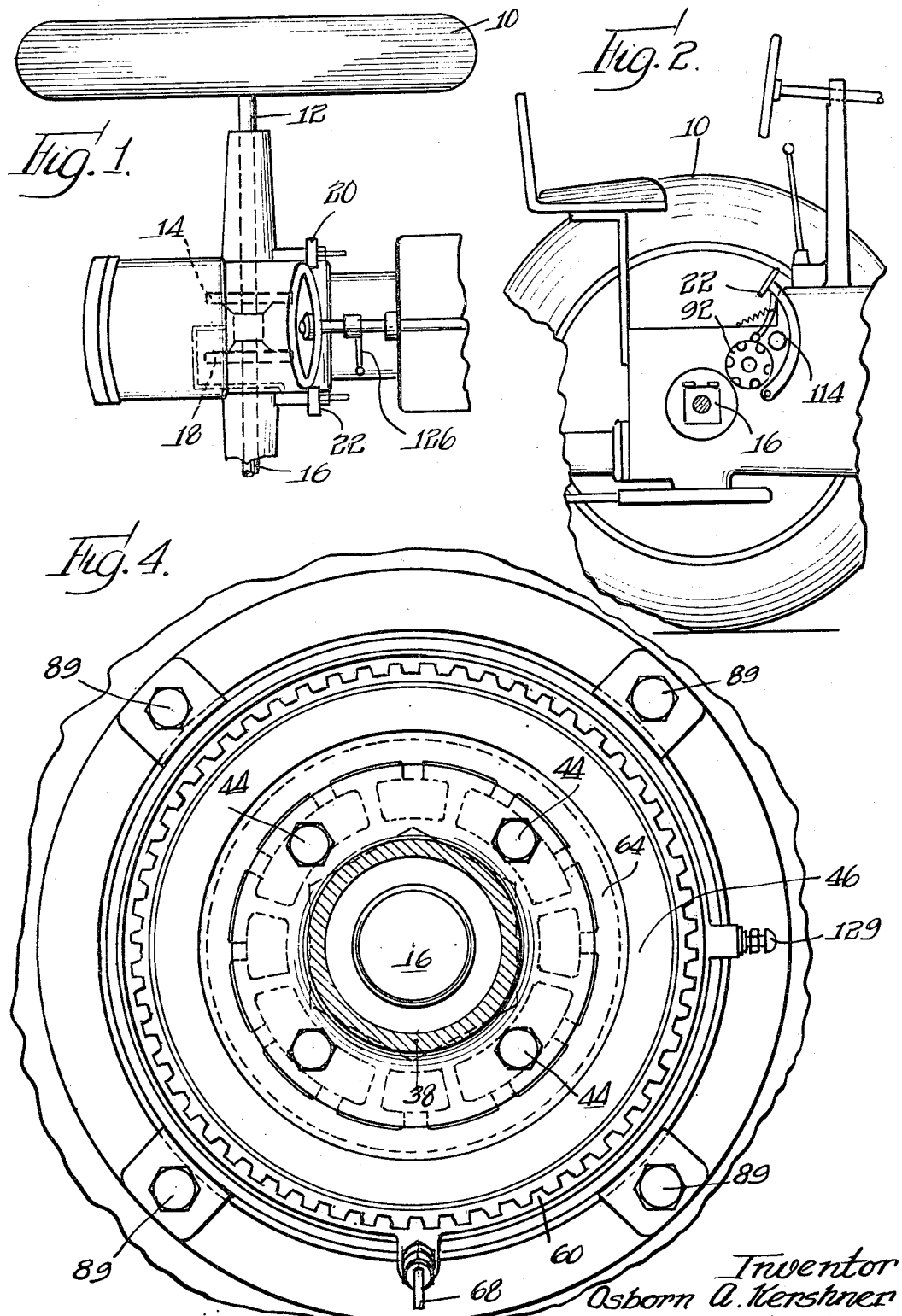

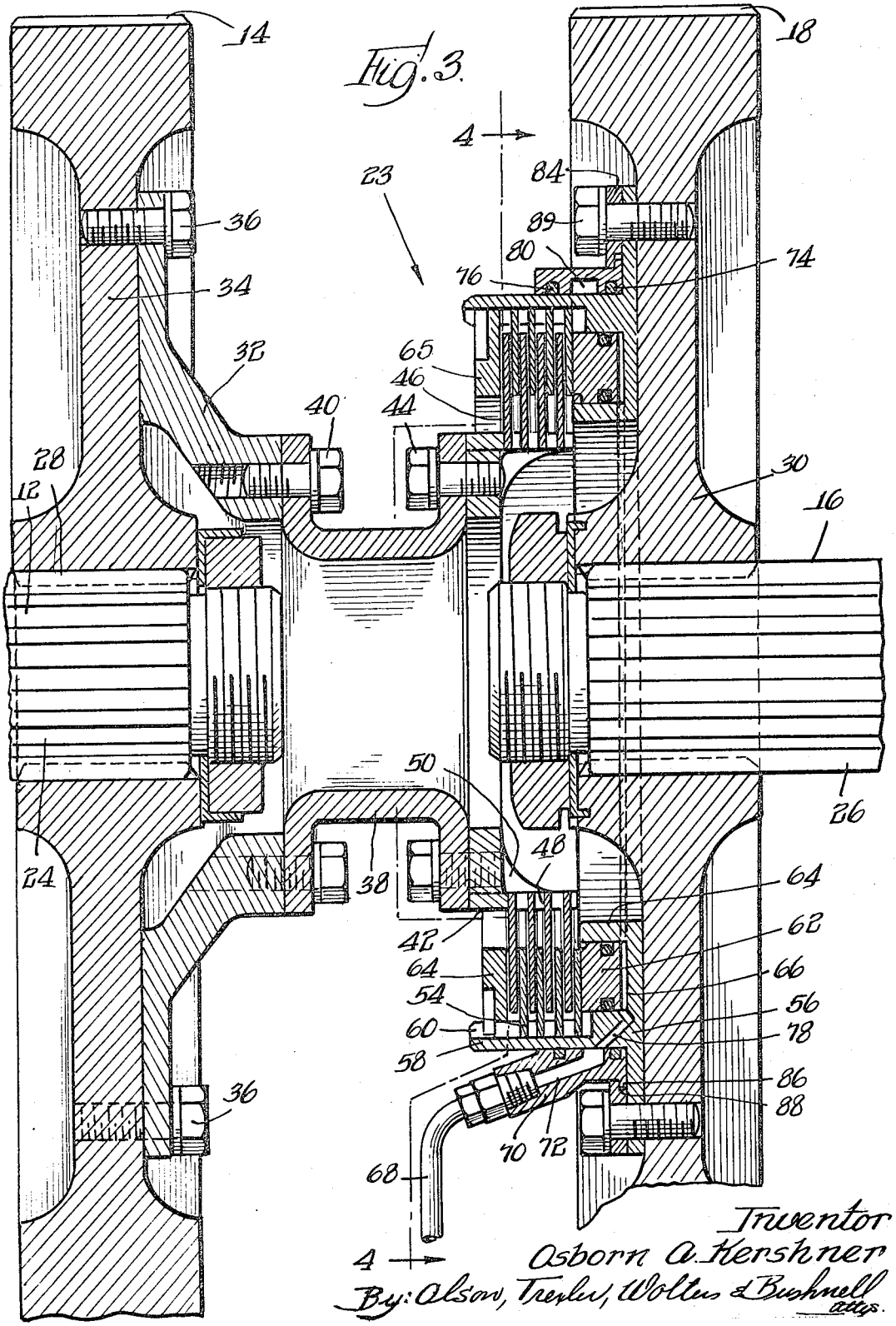

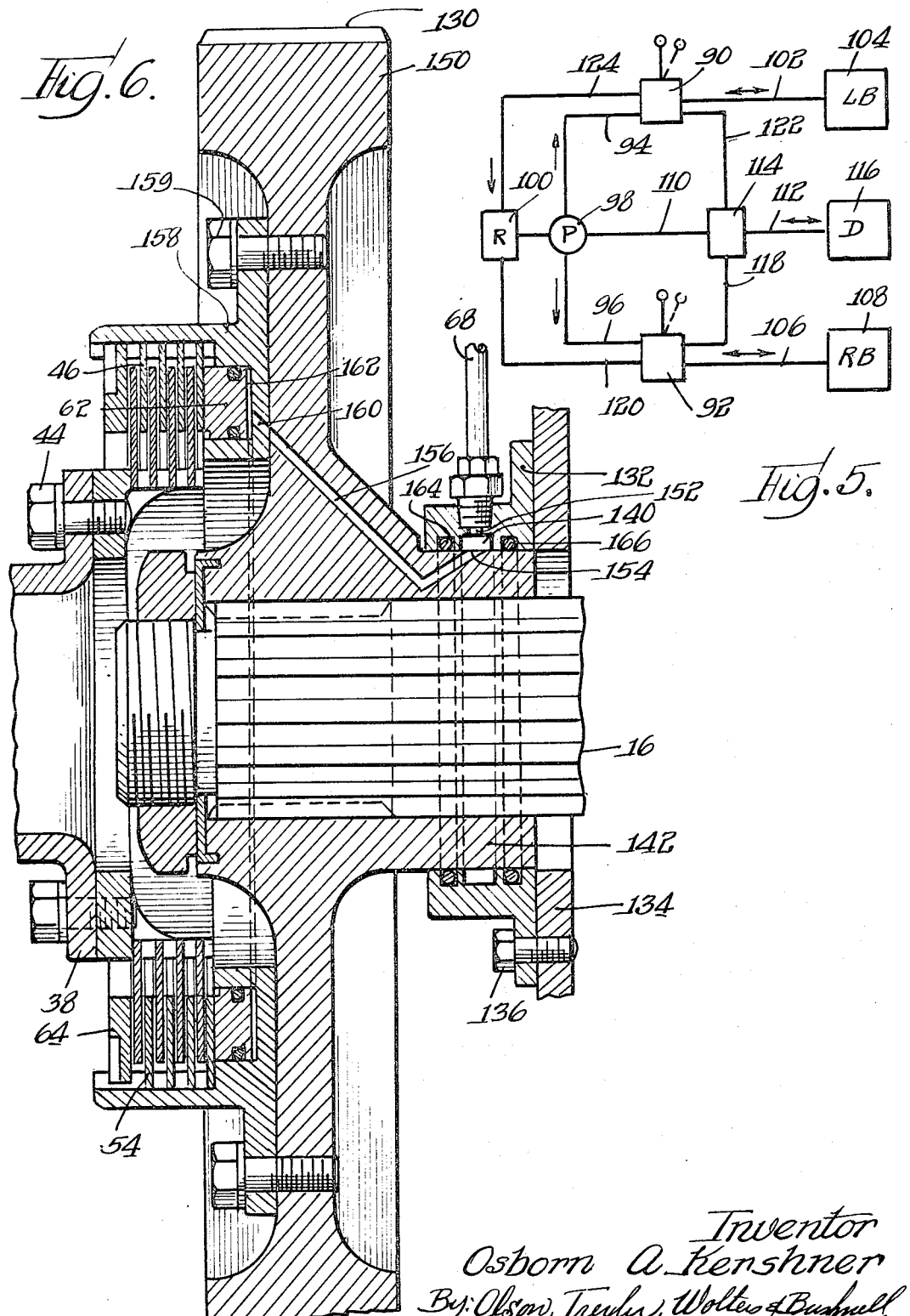

3,383,950
DIFFERENTIAL BRAKE
Osborn A. Kershner, St. Joseph, Mich., assignor, by mesne assignments, to Lambert Brake Corporation, St. Joseph, Mich., a corporation of Michigan
Filed Jan. 27, 1966, Ser. No. 523,316
4 Claims. (Cl. 74—710.5)

ABSTRACT OF THE DISCLOSURE

There is disclosed a drive for a tractor or the like which includes axially aligned wheel shafts having large gears thereon driven from a differential mechanism. A hydraulically actuated clutch is mounted between and fixed to the gears for selectively locking the gears for rotation in unison. Hydraulic actuating fluid is supplied to the clutch through a fixed manifold surrounding and sealingly engaging a surface on either an end member of the clutch or a portion of the gear on which said end member is mounted.

---

This invention relates to a vehicle drive and more particularly to a drive assembly for tractors and the like.

It is a common practice to provide separate brakes for each drive wheel of a tractor and to utilize the brakes to steer the tractor. When it is desired to turn the tractor to the left, the brake for the left wheel is applied and the speed of rotation of the left wheel will be reduced by this application of braking force causing the tractor to turn toward the left. Similarly, when the brake for the right wheel is applied the tractor will turn to the right.

Relative rotation of gears in differential mechanism of the drive train for the tractor causes the tractor to turn when the brake for one wheel is applied. The relative rotation of the differential gears, commonly called differential slippage, is desirable and necessary when used for steering. However, when one of the wheels loses its traction, in mud or snow, the differential slippage results in one wheel remaining stationary while the other wheel spins. The tractor is then stuck in the mud or snow in which it is traveling.

One of the objects of this invention is to provide a brake or clutch which prevents undesired slippage of one driving wheel of the vehicle relative to the other driving wheel.

Another object of this invention is to provide a differential brake or clutch which will eliminate undesired slippage and permit the vehicle to be steered by the application of the driving wheel brakes.

Another object of this invention is to provide a differential brake or clutch which is compact.

Another object of this invention is to provide a differential brake or clutch which can be installed on an existing vehicle with a minimum amount of modifications to the vehicle.

Still another object of this invention is to provide a differential brake or clutch which is actuated by the vehicle's hydraulic system.

For a fuller understanding of the nature and objects of the invention, reference should be had to the following detailed description taken in connection with the accompanying drawings wherein:

FIG. 1 is a fragmentary top view of a tractor on which a differential braking system has been installed;

FIG. 2 is a fragmentary elevation view of a tractor using a modified form of the differential braking mechanism;

FIG. 3 is a fragmentary sectional view of the differential brake or clutch as installed;

FIG. 4 is a fragmentary plan view along the line 4—4 of FIG. 3;

FIG. 5 is a schematic drawing of the hydraulic control system for the differential braking or clutch system; and FIG. 6 is a fragmentary sectional view of a modified form of the differential brake or clutching system as shown in FIG. 3.

Referring now in detail to the drawings, specifically to FIGS. 1 and 2, there is shown a tractor in which my novel differential braking or clutch system has been installed. The tractor is driven by two rear wheels, of which one only is shown. The rear wheel 10 is connected to an axle 12 which is driven by a "bull" or drive gear 14. The other drive wheel, not shown, is mounted on a second axle 16 which is connected to a second "bull" or drive gear 18. The two drive gears 14 and 18 are driven by the tractor engine through a suitable drive train which includes a differential gearing mechanism. Such drive trains are well known and need not be described in detail at this time.

The tractor shown in FIGS. 1 and 2 is steered by the actuation of the brakes for the two driving wheels. As previously explained, when the left brake is applied the tractor will turn left and conversely, when the right brake is applied the tractor will turn to the right. Since this braking and steering system is well known to those skilled in the art it need not be further described at this time. However, it should be noted that the left brake is applied by actuation of a left brake pedal 20 and the right brake is applied by actuation of a right brake pedal 22.

A tractor which utilizes this type of steering and braking system must have a drive train constructed in such a manner that one drive wheel can rotate at a faster rate than the other drive wheel. Drive trains which permit one wheel to rotate at a faster rate than the other wheel have an inherent drawback of permitting the tractor to become stuck when only one wheel loses its traction. The one wheel, which has lost its traction, will spin while a wheel which still has traction will remain stationary in the mud.

The present invention overcomes this weakness in drive trains by permitting the two drive wheels to be interconnected by a clutch or brake mechanism 23, shown in FIG. 3. When engaged, the clutch or brake mechanism 23 will prevent one wheel from rotating at a faster rate than the other wheel. When the clutch mechanism is disengaged, the wheels of the tractor are permitted to rotate relative to each other. Therefore, when the tractor is being driven, and is not being turned, the differential brake or clutch can be engaged to lock the two drive gears and wheels together. When the tractor is being turned, the clutch is disengaged to permit relative rotation of the drive wheels.

The two drive gears 14 and 18, as shown in FIG. 3, are connected to the two axles 12 and 16 by teeth or splines 24 and 26 on the two axles. The splines 24 and 26 mate with suitable splines which are cut into the interior of the hubs of the gears 14 and 18. The gears 14 and 18 are driven by a differential drive system, which is not shown, and transmit the drive force to their respective axles and drive wheels.

A flange member 32 is connected to the web of the gear 14 by bolts 36. A tubular connecting member 38 is attached to the flange 32 by bolts 40. Similarly, the opposite end of the tubular connecting member 38 is attached to an interior mounting disc 42, by bolts 44.

The interior mounting disc 42 has a plurality of radially outwardly extending friction discs 46 slidably connected thereto. The friction discs are mounted on splines or teeth 48 which are on the exterior surface of a depending flange 50 of the interior mounting disc 42. The splines 48 retain the discs against rotational movement, while permitting the disc to move longitudinally, relative to the interior mounting disc 42.

Friction discs 54 are interspaced between the friction discs 46. The friction discs 54 are mounted on an exterior mounting or base disc 56 which is located radially exteriorly of the interior mounting disc 42. A flange 58 of the exterior mounting or base disc 56 has splines 60, similar to the splines 48 on the interior mounting disc. The splines 60 permit the friction discs 54 to move longitudinally relative to the mounting or base disc 56 while preventing rotational movement of the friction disc. The interspacing of the coaxial friction discs enables a maximum amount of friction surface area to be provided in a minimum amount of space. This compact friction disc structure permits the brake or clutch mechanism to be installed in a location having limited space, such as between the drive gears 14 and 18.

The friction discs 46 and 54 may be moved longitudinally or axially by an actuator ring or piston 62. The actuator ring or piston 62 is positioned relative to the exterior mounting base or disc 56 by a flange 64. A backing member 65 is connected to the exterior mounting disc 56 and limits the axial or longitudinal movement of the clutch actuator ring 62 relative to the mounting disc 56. When the brake actuator ring or piston 62 is moved longitudinally or axially to press the friction discs 46 and 54 together the two clutch mounting discs 42 and 56 will be operatively connected by the friction discs 54 and 46. Since relatively large surface areas on the friction discs are being compressed together by the actuator ring 62, the clutch will not permit relative rotation of the mounting discs 42 and 56.

The actuator ring or piston 62 is actuated by hydraulic fluid which enters a chamber or cylinder 66 between the actuator ring 62 and mounting or base disc 56. A hydraulic fluid supply line or conduit 68 is connected to a manifold ring 70 by a passage 72. The manifold ring 70 remains stationary relative to the tractor, while the gear 18 and the exterior mounting disc 56 rotate. The joint between the relatively sationary manifold ring 70 and the mounting disc 56 is sealed by two elastomeric seals 74 and 76.

The exterior mounting disc 56 has a passage 78 drilled therein communicating with the chamber or cylinder 66 so that the fluid from the hydraulic fluid supply line or conduit 68 may enter the chamber or cylinder 66 through the passage 78. Since there is a single passage 78, the stationary manifold ring has an annular chamber 80 which extends around the interior of the ring to constantly supply fluid to the rotating passage 78.

The manifold ring 70 is held against longitudinal or axial movement by a positioning ring 84, which is located at the base of the manifold ring. A tongue member 86, of the manifold ring, extends into a recess 88 in the positioning ring 84. The positioning ring 84 and the exterior mounting disc 56 are mounted on the web of the gear 18 by the bolts 89. The tongue and groove joint between the manifold ring 70 and the positioning ring 84 is machined in such a manner as to retain the ring 70 in position while permitting the positioning ring 84 to be rotated relative to the manifold ring 70.

From the foregoing description it will be apparent that when a hydraulic fluid, under suitable pressure, enters the manifold ring passage 72, and the chamber 66, the clutch actuator ring 62 will be forced longitudinally or coaxially outward. This outward movement of the clutch actuator ring 62 will compress the coaxial friction discs 46 and 54 together against the backing member 65 of the exterior mounting disc 56. The compressed friction discs 46 and 54 will prevent any relative movement of their respective mounting discs 42 and 56. Thus, the drive gear 14, which is connected directly to the mounting disc 42, and the drive gear 18, which is connected directly to the mounting disc 56, will both rotate at the same speed. Since the wheels of the tractor are connected to the drive gears 14 and 18, there will be no relative rotation of the two wheels.

The coaxial arrangement of the gears 14 and 18, friction discs 46 and 54 and the actuator ring 62, results in a brake or clutch mechanism which requires a minimum amount of installation space. While taking up relatively little space, the engagement of the coaxial brake or clutch mechanism firmly locks the two drive gears 14 and 18 against relative movement. Since the brake or clutch mechanism is connected directly to the gears 14 and 18, the need for a system of gears or links, between the clutch mechanism and the drive gears 14 and 18, is eliminated.

The differential brake or clutch mechanism can be easily installed in existing tractors. When installing the mechanism on an existing tractor the flange member 32 is bolted to the web of the drive gear 14 of the tractor. The clutch or brake mounting disc 56 is then bolted to the web of the gear 18 by the bolts 89. The tubular connecting member 38 is then inserted between the flange 32 and the interior mounting disc 42 and bolted into position.

It is apparent that this structure permits the differential brake or clutch mechanism to be installed on either new or existing tractors with a minimum amount of effort. The only necessary modification to the drive equipment is the addition of some bolt holes to the drive gears. If it is necessary to remove the differential clutch or brake mechanism for maintenance it is a relatively simple matter to disconnect the tubular connecting member 38 and remove the entire brake or clutch mechanism.

The differential brake or clutch mechanism can be easily installed as optional auxiliary equipment on new tractors. Since the mechanism is installed coaxially with the two drive gears 14 and 18, the body structure of the tractor does not have to be modified for the mechanism. Also, the drive train from the tractor engine to the drive gears is unaffected by the installation of the differential brake or clutch mechanism.

By placing the differential brake or clutch mechanism between the two drive gears 14 and 18 the differential brake or clutch mechanism need only be capable of interlocking the two drive gears. The force required to do this will be lower than the force transmitted by the drive mechanism to the drive gears 14 and 18 since only the torque which is lost due to lack of traction of one of the drive wheels need be transmitted between the two drive gears 14 and 18. If the differential brake or clutching mechanism was inserted in the drive train between the engine of the tractor and the two drive gears 14 and 18, the differential brake or clutching mechanism would have to be capable of transmitting the relatively high torque of the tractor engine to the drive gear of the relatively high turning rate of the drive train.

The hydraulic control mechanism for both vehicle brakes and the differential brake clutch mechanism is shown in FIG. 5. The two actuator valve mechanisms 90 and 92 represent schematically the two brake pedals 20 and 22 and the valve mechanism associated with the brake pedals. Hydraulic lines 94 and 96 connect the two actuator and valve mechaisms 90 and 92 to a pump 98 which supplies hydraulic fluid under pressure to the actuator mechanism from a reservoir 100.

When the actuator mechanism 90 is engaged by moving the lever to the position shown by dotted lines in FIG. 5, a brake line 102 is connected to the hydraulic fluid supply line 94 to actuate the left brake 104. When the right brake actuator mechanism is operated, hydraulic fluid supply line 106 is connected to the hydraulic line 96, from the pump 98, to actuate the right brake 108. When the two brake actuators are in their unactuated position, i.e., the position shown in FIG. 5 by solid lines, the differential brake or clutch mechanism 116 will be supplied with fluid from the pump 98 through the hydraulic lines 110 and 112. When one of the brake actuators 90 or 92 is actuater, a four-way valve mechanism 114 will be actuated to exhaust the differential brake or clutch mechanism 116 to the reservoir 100. The differential brake mechanism will exhaust to the reservoir 100 through either hydraulic lines 118 and 120 or lines 122 and 124 depending upon whether the left brake or the right brake is actuated.

The differential brake mechanism 116 must, when one of the brakes 104 or 108 is applied, be disengaged. The brakes 104 and 108 must be able to steer the tractor by preventing one of the drive wheels 10 of the tractor from rotating. If the differential clutch mechanism 116 was engaged when one of the brakes 104 or 108 was applied, the tractor would merely slow down without turning. The two wheels would be interconnected by the differential clutch mechanism and would be incapable of rotating at different rates. Thus the valve mechanism 114, which is controlled by actuation of either of the brake pedals 20 or 22 (see FIG. 2), will exhaust the differential brake or clutch mechanism to the reservoir 100 to disengage the differential clutch mechanism.

It will be apparent from the foregoing description that the hydraulic control mechanism permits the differential clutch mechanism to be engaged while the tractor is proceeding in a forward or reverse direction and while the brakes 104 and 108 are not actuated. However, when one of the brakes 104 or 108 is actuated, the differential clutch mechanism 116 will immediately be released to enable the actual brake 104 or 108 to cause the tractor to turn. If both of the brakes 104 and 108 are actuated at the same time, the differential brake or clutch mechanism will also be released and the tractor will come to a stop without turning. This control system permits the brakes 104 and 108 to be utilized in steering the tractor while at the same time permitting the differential clutch mechanism 116 to eliminate any unnecessary and undesired relative rotation between the two drive wheels of the tractor.

It will be apparent to those skilled in the art that the valve mechanism 114 could be replaced with a manually actuated system such as shown in FIG. 1. If a manually operated lever 126 of FIG. 1 is actuated, the differential brake mechanism 116 will be disengaged, enabling the tractor to be steered by depressing either one of the two brake pedals 20 and 22. It should be noted that unless the lever 126 is depressed, the differential brake or clutch mechanism will remain engaged and the two driving wheels will rotate together regardless of the amount of traction for the two wheels. The manually actuated differential clutch mechanism of the embodiment shown in FIG. 1, has the advantage of being easily installed in existing tractors since the brake actuating mechanisms 90 and 92 do not include a special valve to exhaust the differential brake clutch or mechanism 116 to the reservoir 100.

The hydraulic pump 98 for the control mechanism can be the same hydraulic pump as is used for the hydraulic system which operates the other equipment used with the tractor. Thus the only equipment required for the installation of the differential clutch mechanism in an existing tractor would be the brake or clutch mechanism itself and a manually actuated valve system connected to the existing hydraulic pump of the tractor. The hydraulic system, when installed, may be easily bled through the bleed screw 129 (see FIG. 4).

A modified form of the differential brake system is shown connected to the gear 130 in FIG. 6. In this construction, the hydraulic line 68, which corresponds to the line 112 in FIG. 5, is connected to a manifold ring 132. The annular manifold ring 132 is bolted to a relatively stationary frame member 134 of the tractor by a bolt 136.

The manifold ring 132 has an annular chamber 140 which is connected, by the passage 152 in the manifold ring 132, to the hydraulic line or conduit 68. The annular chamber 140 is adjacent to the outer surface of a hub 142 of the gear 130. It will be apparent that the annular chamber 140 permits the fluid from the line 68 to completely surround the rotating hub 142 of the gear 130.

A passage 156 extends through the hub of the gear 130 and terminates at an aperture 154 in the outer surface of the hub 142. The other end of the passage 156 is connected to a passage 160 in the mounting disc 158. The passage 160 connects the passage 156 to a chamber or cylinder 162 in the mounting disc 158. The mounting disc 158 is connected to the web of the gear 130 by the bolt 159. Fluid from the line or conduit 68 is conducted to the chamber or cylinder 162 through the two passages 156 and 160 to engage the brake actuator ring or piston 62. The actuator ring or piston 62 presses the friction discs 46 and 54 together, as previously explained. The remaining parts of the clutch mechanism shown in FIG. 6 are similar to those in FIG. 3 and have similar numbers.

The modified brake or clutch mechanism which is shown in FIG. 6 has the advantage of reducing the possibility of potential seal problems. Seals 164 and 166 seal the manifold ring 132 where it joins the hub 142 of the gear 130. The hub 142 has a smaller diameter than the exterior surface of the flange member 58 of the embodiment shown in FIG. 3. Therefore, the peripheral velocity of the surface of the hub 142 will be lower than the peripheral velocity of the surface of the flange member 58 when the gears 130 and 18 are both rotated at the same number of revolutions per minute. Since the peripheral velocity is lower with the embodiment of FIG. 6, the gear 130 may be rotated at a higher r.p.m. than the gear 18 without unduly increasing sealing problems at the joint between the stationary manifold ring and the gear hub.

It will be apparent that the embodiment of FIG. 6 is particularly useful when the drive gears of the vehicle, in which the differential brake mechanism is installed, travel at a relatively high rate of rotation. However, the embodiment of FIG. 3 may be easily installed on existing gears without extensive modification of the gear. The embodiment shown in FIG. 6, when installed on existing gears, will require that the gear hub be drilled for a passage 156 to provide fluid communication between the manifold ring 132 in the chamber 162.

While differential brake mechanisms have been shown and described as being installed in a tractor, it will be apparent to those skilled in the art that this mechanism could be used on any other vehicle. Therefore, while particular embodiments of the invention have been shown, it should be understood that the invention is not limited thereto, since many modifications may be made, and it is, therefore, contemplated to cover by the appended claims any modifications as will fall within the true spirit and scope of the invention.

What is claimed is:

1. A vehicle drive assembly comprising axially aligned first and second wheel rotatable axle members, first and second brake means operatively connected with said axle members and selectively operable for stopping and steering the vehicle, said drive assembly including a first large diameter gear mounted on said first axle member and having rim, web and hub portions, a second large diameter gear mounted on said second axle member and having rim, web and hub portions, a friction device disposed between said gears for selectively connecting said gears together for rotation in unison, said friction device including a base member mounted on said web portion of said first gear, first annular flange means extending axially from said base member toward said second gear, in interior disc, connecting means fixed to and carried by said second gear and fixed to and mounting said interior disc radially interiorly of said first flange means, second flange means extending from said interior disc within said first flange means, interspaced first and second friction discs disposed between and respectively connected with said first and second flange means, annular cylinder means in said base member, annular piston means in said cylinder means for engaging said friction disc means for locking said first and second gears together, one of said base member and said first gear hub portion having an annular radially outwardly facing surface, a fixed annular manifold means surrounding and sealingly engaging said surface and connectable with a source of hydraulic fluid under pressure for actuating said piston, and passageway means connecting said manifold member and said cylinder.

2. A drive assembly as defined in claim 1, wherein said surface is on said base member and said passageway means extends through said base member into said cylinder.

3. A drive assembly as defined in claim 1 wherein said surface is on said first gear hub portion, and said passageway means extends through said first gear and said base member.

4. An assembly as set forth in claim 3 wherein said base member is mounted on one side of said first gear and said manifold means is mounted on a second side of said first gear.

References Cited

UNITED STATES PATENTS

| | | | |
|---|---|---|---|
| 2,611,442 | 9/1952 | Thomas | 180—6.2 |
| 2,669,330 | 2/1954 | Banker | 192—13 X |
| 2,885,018 | 5/1959 | Jackson | 180—75 |

DONLEY J. STOCKING, *Primary Examiner.*

ARTHUR T. McKEON, *Examiner.*